United States Patent [19]
Beck et al.

[11] Patent Number: 5,200,078
[45] Date of Patent: Apr. 6, 1993

[54] MICROPOROUS MEMBRANES FROM POLY(ETHERETHERKETONE)-TYPE POLYMERS

[75] Inventors: Henry N. Beck, Walnut Creek; Richard A. Lundgard, Antioch; Robert D. Mahoney, Danville, all of Calif.

[73] Assignee: The Dow Chemical Company, Midland, Mich.

[21] Appl. No.: 612,775

[22] Filed: Nov. 9, 1990

Related U.S. Application Data

[60] Division of Ser. No. 380,058, Jul. 14, 1989, Pat. No. 5,064,580, which is a continuation-in-part of Ser. No. 175,716, Mar. 31, 1988, Pat. No. 4,904,426.

[51] Int. Cl.$^5$ ............................................. B01D 39/16
[52] U.S. Cl. ........................... 210/500.23; 210/500.27; 210/500.28
[58] Field of Search ...................... 264/41, 203, 209.1, 264/211.15, 211.16, 211.14, 211.19, 184; 528/491, 480, 125, 126, 128; 210/500.23, 500.27, 500.28

[56] References Cited

U.S. PATENT DOCUMENTS

| | | | |
|---|---|---|---|
| 3,637,592 | 1/1972 | Berr | 260/47 R |
| 4,419,486 | 1/1983 | Rose | 525/534 |
| 4,664,681 | 5/1987 | Anazawa et al. | 55/158 |
| 4,714,725 | 12/1987 | Hendy et al. | 524/108 |
| 4,804,472 | 2/1989 | Handlin | 210/500.27 |
| 4,820,419 | 4/1989 | Hendy et al. | 210/651 |
| 4,904,426 | 2/1990 | Lundgard et al. | 264/41 |
| 4,957,817 | 9/1990 | Chau et al. | 428/436 |

FOREIGN PATENT DOCUMENTS

| | | |
|---|---|---|
| 0192408 | 8/1986 | European Pat. Off. |
| 0254431 | 1/1988 | European Pat. Off. |
| 3402471 | 8/1985 | Fed. Rep. of Germany |
| 62-095104 | 5/1987 | Japan |
| 2180790 | 4/1987 | United Kingdom |

OTHER PUBLICATIONS

Jin et al., "A Sulfonated Poly(aryletherketone)," Dept. of Polymer Science and Engineering, University of Massachusetts, 1984.

Dr. Klaus Dahl (Raychem Corporation), "Heat Resistant Semicrystalline Poly(phenylene ether ketones); Melt Processable High Performance Polymers" *Industrial Affiliates Symposium On High Performance Polymers*, Department of Chemistry and Chem. Eng., Stanford University, Dec. 3–5, 1986.

Bishop et al., "Solubility and Properties of a Poly(aryletheketone) in Strong Acids," *Macromolecules*, vol. 18, American Chemical Society, 1985, pp. 86–93.

Lovinger, et al., "Solution Crystallization of Poly(etheretherketone)," vol. 19, American Chemical Society, 1986, pp. 1861–1867, *Macromolecules*.

Victrix PEEK Product Brochure, ICI, 1986.

Attwood et al, "Synthesis and Properties of Polyaryletherketones", *Polymer Preprints*, vol. 20, abd, ACS, Apr. 1979, pp. 191–194.

*Primary Examiner*—Leo B. Tentoni

[57] ABSTRACT

The invention relates to a microporous membrane prepared from unsulfonated poly(etheretherketone)-type polymers.

13 Claims, 1 Drawing Sheet

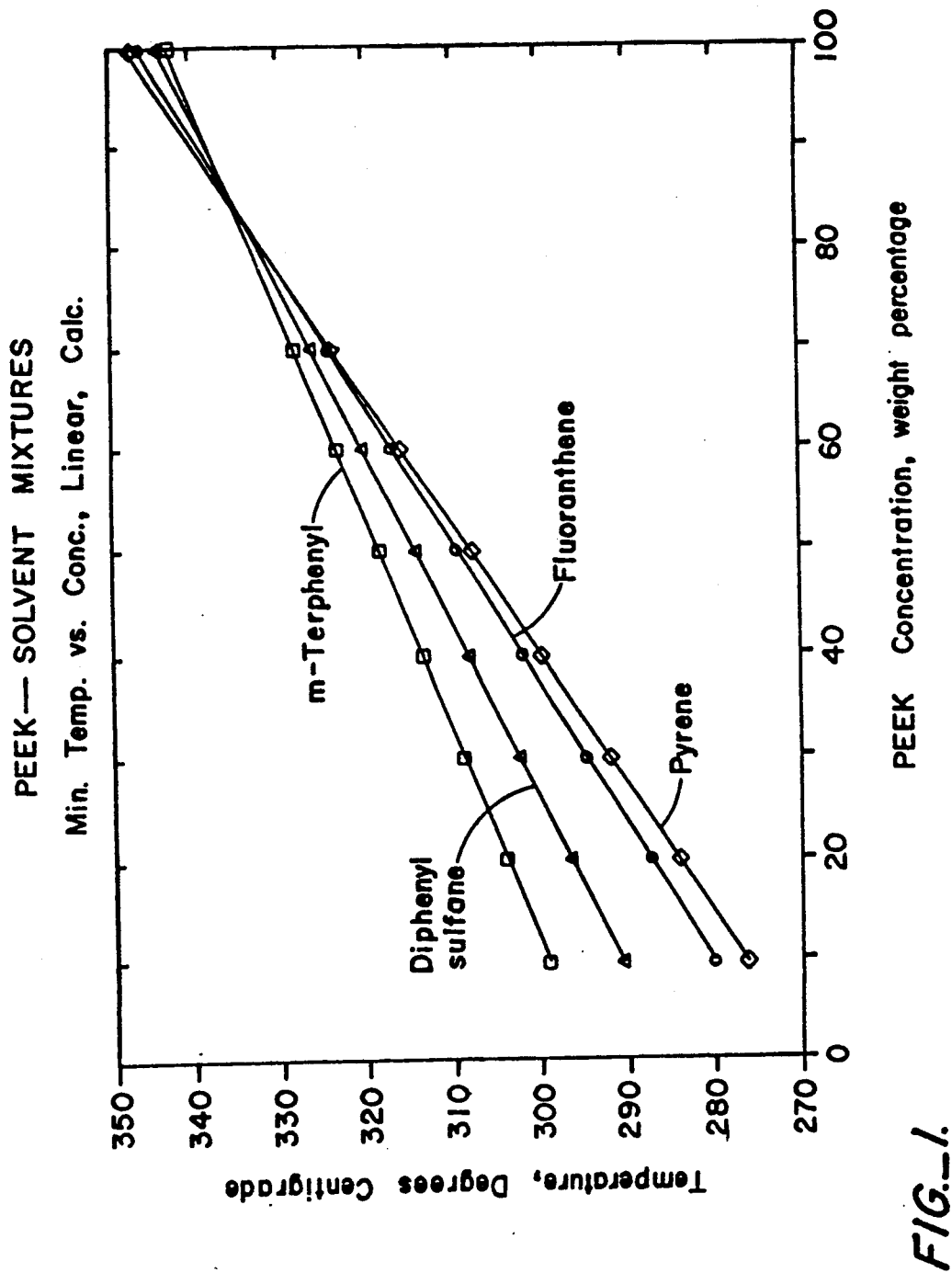
FIG._1.

MICROPOROUS MEMBRANES FROM POLY(ETHERETHERKETONE)-TYPE POLYMERS

CROSS REFERENCE TO RELATED PATENT APPLICATION

This application is a divisional of U.S. patent application Ser. No. 380,058 filed Jul. 14, 1989, now U.S. Pat. No. 5,064,580, which in turn is a continuation-in-part of U.S. patent application Ser. No. 175,716 filed Mar. 31, 1988, now U.S. Pat. No. 4,904,426.

BACKGROUND OF THE INVENTION

This invention relates to microporous membranes prepared from poly(etheretherketone)-type polymers and a process for making the same. Such membranes are useful in the treatment of liquids by the membrane separation processes of ultrafiltration, microfiltration, membrane distillation, and membrane stripping. The membranes of this invention are also useful as microporous supports for composite liquid or gas separation membranes.

In the past, microporous membranes have been fabricated from polyolefins such as polyethylene and polypropylene. One typical method of preparing these membranes is by an extrusion process which involves dissolving the polyolefin in a solvent or a mixture of solvent and non-solvent, extruding the polymer/solvent/non-solvent mixture into membranes, and immersing the membranes into a leach bath. Another method of preparing these membranes is by a melt-extrusion process which involves extruding the membranes from the molten polyolefin, followed by cold drawing the membranes. However, polyolefins, while inexpensive and easy to process, exhibit relatively low heat distortion temperatures.

Poly(etheretherketone)-type polymers are high performance thermoplastics which possess high glass transition temperatures, high crystalline melting points, high thermal stability, and high solvent resistance. These properties make poly(etheretherketone)-type polymers useful for membranes used in liquid separations, particularly membrane separation processes which involve treatment of organic, acidic, or basic liquids at elevated temperatures.

The very properties which make poly(etheretherketone)-type polymers desirable materials for use in applications which require high temperature and/or solvent resistance also make the polymers very difficult to process into membranes. Poly(etheretherketone)-type polymers are extremely solvent resistant and are therefore considered to be insoluble in all common solvents. Therefore, to form membranes, for example, poly(etheretherketone) is typically dissolved in very strong organic acids such as concentrated sulfuric acid to sulfonate the poly(etheretherketone), which renders the sulfonated poly(etheretherketone) soluble in common solvents such as dimethylformamide and dimethylacetamide. The problem with this process is that the polymer in the fabricated membrane is not poly(etheretherketone), but rather sulfonated poly(etheretherketone), which is soluble in common solvents. Furthermore, sulfonated poly(etheretherketone) swells in aqueous solutions, which adversely affects membrane performance in aqueous separation applications.

What is needed is a process of preparing microporous poly(etheretherketone)-type membranes using plasticizers which do not chemically modify or degrade the poly(etheretherketone)-type polymer during fabrication so that the high strength, temperature resistance, and solvent resistance of the unsulfonated poly(etheretherketone)-type polymer is retained by the fabricated membranes.

SUMMARY OF THE INVENTION

The invention is a microporous semi-permeable membrane comprised of an unsulfonated poly(etheretherketone)-type polymer.

In another aspect, this invention is a process for preparing a microporous poly(etheretherketone)-type membrane comprising the steps of:

A. forming a mixture of:
  (i) at least one unsulfonated poly(etheretherketone)-type polymer, and
  (ii) a plasticizer comprising at least one organic compound capable of dissolving at least about 10 weight percent of the poly(etheretherketone)-type polymer at the extrusion or casting temperature;
B. heating the mixture to a temperature at which the mixture becomes a homogeneous fluid;
C. extruding or casting the homogeneous fluid under conditions such that a membrane is formed;
D. quenching or coagulating the membrane by passing the membrane through at least one zone under conditions such that the membrane solidifies: and
E. leaching the membrane by passing the membrane through at least one zone under conditions such that at least a portion of the plasticizer for the unsulfonated poly(etheretherketone)-type polymer is removed from the membrane;

wherein before, during, and/or after the leach step the membrane is drawn to increase the flux of fluid through the membrane while the membrane is at a temperature above about 25° C. and below the crystalline melting point of the poly(etheretherketone)-type polymer or the depressed melting point of the poly(etheretherketone)-type polymer and plasticizer mixture.

These membranes have excellent solvent and temperature resistance. The membranes also possess high tensile strength. The membranes are useful as microporous membranes for liquid separations and as microporous supports for composite liquid or gas separation membranes.

BRIEF DESCRIPTION OF THE DRAWING

FIG. 1 illustrates a composite of temperature at ambient pressure at which a specific weight percent of PEEK will dissolve in the solvents m-terphenyl, pyrene, fluoranthene, and diphenylsulfone.

DETAILED DESCRIPTION OF THE INVENTION

Poly(etheretherketone)-type polymers refers to polymers containing predominantly ether, —R—O—R—, and ketone, —R—CO—R—, linkages, wherein R is a divalent aromatic group. R is preferably a substituted or unsubstituted phenylene of Formula 1:

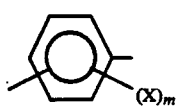

Formula 1 wherein

X is independently in each occurrence hydrogen, a $C_{1-4}$ alkyl, or a halogen; and m is an integer between 0 and 4 inclusive.

X is preferably hydrogen, methyl, ethyl, chlorine, bromine, or fluorine.

Examples of preferred poly(etheretherketone)-type polymers within the scope of this invention include poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketoneetherketoneketone) (PEKEKK), and mixtures thereof. An especially preferred poly(etheretherketone)-type polymer for use in this invention is PEEK, that is, poly(oxy-p-phenyleneoxy-p-phenylenecarbonyl-p-phenylene). PEEK is comprised of the repeat units described in Formula 2:

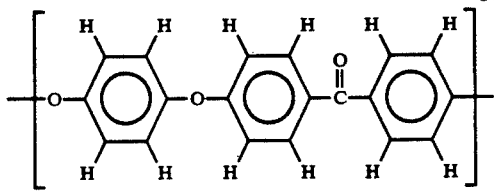

Formula 2

Another especially preferred poly(etheretherketone)-type polymer for use in this invention is PEK, that is, poly(oxy-1,4-phenylenecarbonyl-1,4-phenylene). PEK is comprised of the repeat units described in Formula 3:

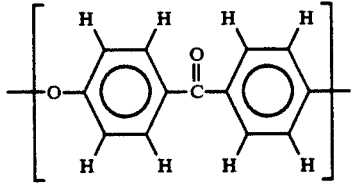

Formula 3

The poly(etheretherketone)-type polymers useful in this invention are unsulfonated. The poly(etheretherketone)-type polymers from which the membranes are fabricated preferably possess a degree of crystallinity of at least about 30 percent and a melting point of at least about 190° C.

Commercially available PEEK, for example, VICTREX ® PEEK 450 (®trademark of ICI Americas), possesses a glass transition temperature of about 143° C. and a melting point of about 334° C. Such commercially available PEEK possesses a tensile strength of about 13,300 psi. (ASTM Test Method D638), an elongation at break of about 50 percent (ASTM Test Method D638 at about 23° C. and test speed of about 0.2 in./min.), an ultimate shear strength of about 13,800 psi. (ASTM Test Method D3846), a shear modulus of 188,500 psi. (at about 23° C.), and a tensile modulus (1 percent secant) of about 522,100 psi. (ASTM Test Method D638 at about 23° C.). The synthesis of such polymers is known in the art. See U.S. Pat. Nos. 4,320,224 and 4,331,798, the relevant portions incorporated herein by reference.

The plasticizers useful in this invention comprise at least one organic compound preferably capable of dissolving at least about 10 weight percent of the poly(etheretherketone)-type polymer present at the extrusion or casting temperature. The plasticizer more preferably dissolves at the extrusion or casting temperature at least about 25 weight percent of the poly(etheretherketone)-type polymer, even more preferably about 50 weight percent of the poly(etheretherketone)-type polymer. The plasticizer may be comprised of a solvent for the poly(etheretherketone)-type polymer or a mixture of a solvent and non-solvent for the poly(etheretherketone)-type polymer, provided the solvent/non-solvent mixture itself is capable of dissolving at least about 10 weight percent of the poly(etheretherketone)-type polymer at the extrusion or casting temperature. A solvent for the poly(etheretherketone)-type polymer dissolves at least about 10 weight percent poly(etheretherketone)-type polymer at the extrusion temperature. A non-solvent for the poly(etheretherketone)-type polymer dissolves less than about 10 weight percent of the poly(etheretherketone)-type polymer at the extrusion or casting temperature.

A preferred class of solvents useful in this invention are organic compounds consisting predominantly of carbon and hydrogen and optionally oxygen, nitrogen, sulfur, halogen, and mixtures thereof, wherein the organic compound has a molecular weight of between about 160 and about 450, contains at least one six membered aromatic ring structure, and possesses a boiling point of between about 150° and about 480° C.

Preferred solvents useful in this invention include diphenic acid, N,N-diphenylformamide, benzil, anthracene, 1-phenylnaphthalene, 4-bromobiphenyl, 4-bromodiphenylether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (trademark of the Monsanto Company), 1-phenyl-2-pyrrolidinone, 4,4'-isopropylidenediphenol, 4,4'-dihdroxybenzophenone, quaterphenyl, and mixtures thereof. Not all of these solvents are equally effective with all poly(etheretherketone)-type polymers. One of ordinary skill in the art can readily select the best solvent for a specific polymer empirically.

More preferred solvents include N,N-diphenylformamide, benzil, anthracene, 1-phenylnaphthalene, 4-bromobiphenyl, 4-bromodiphenyl ether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2 dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R® mixed terphenyls (®trademark of the Monsanto Company), a mixture of partially hydrogenated terphenyls, for example, THERMINOL 66® partially hydrogenated terphenyls (®trademark of the Monsanto Company), a mixture of terphenyls and quaterphenyls, for example, THERMINOL 66® mixed terphenyls and quaterphenyls (®trademark of the Monsanto Company), 1-phenyl-2-pyrrolidinone, 4,4'-isopropylidenediphenol, 4,4'-dihdroxybenzophenone, quaterphenyl, and mixtures thereof.

Even more preferred solvents include triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R® mixed terphenyls (®trademark of the Monsanto Company), a mixture of partially hydrogenated terphenyls, for example, THERMINOL 66® partially hydrogenated terphenyls (®trademark of the Monsanto Company), a mixture of terphenyls and quaterphenyls, for example, THERMINOL 75® mixed terphenyls and quaterphenyls (®trademark of the Monsanto Company), 1-phenyl-2-pyrrolidinone, 4,4'-isopropylidenediphenol, 4,4'-dihdroxybenzophenone, and mixtures thereof.

Especially preferred solvents include m-terphenyl, p-terphenyl, a mixture of terphenyls, for example, SANTOWAX R® mixed terphenyls (®trademark of the Monsanto Company), a mixture of partially hydrogenated terphenyls, for example, THERMINOL 66® partially hydrogenated terphenyls (®trademark of the Monsanto Company), a mixture of terphenyls and quaterphenyls, for example, THERMINOL 75® mixed terphenyls and quaterphenyls (®trademark of the Monsanto Company), diphenylsulfone, and mixtures thereof.

A preferred class of non-solvents useful in this invention are organic compounds consisting predominantly of carbon and hydrogen and optionally oxygen, phosphorus, silicon, nitrogen, sulfur, halogen, and mixtures thereof, wherein the organic compound has a molecular weight of between about 120 and about 455, and possesses a boiling point of between about 150° and about 480° C. The non-solvents more preferably have a boiling point of between about 280° and about 480° C., even more preferably between about 300° and about 480° C. The non-solvents preferably are soluble in the solvent used at elevated temperatures.

Preferred non-solvents useful in this invention include 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobil Oil Corporation), butyl stearate, 9-phenylanthracene, 2-phenylphenol, 1-ethoxynaphthalene, phenylbenzoate, 1-phenyldecane, 1-methoxynaphthalene, 2-methoxynaphthalene, 1,3-diphenoxybenzene, 1,8-dichloroanthraquinone, 9,10-dichloroanthracene, polyphosphoric acid, 1-chloronaphthalene, diphenylether, 1-cyclohexyl-2-pyrrolidinone, hydrogenated terphenyl, for example, HB-40® hydrogenated terphenyl (®trademark of the Monsanto Company), dioctylphthalate, 5-chloro-2-benzoxazolone, dibenzothiophene, diphenylsulfide, diphenylchlorophosphate, fluorene, sulfolane, methyl myristate, methyl stearate, hexadecane, dimethyl phthalate, tetraethylene glycol dimethylether, diethylene glycol dibutylether, docosane, eicosane, dotriacontane, 2,7-dimethoxynaphthalene, 2,6-dimethoxynaphthalene, o-terphenyl, 1,1-diphenylethylene, epsilon-caprolactam, thianthrene, silicone oil, for example, DC-704® silicone oil and DC-710® silicone oil (®trademarks of Dow-Corning Corporation), and mixtures thereof.

More preferred non-solvents include 1,3,5-triphenylbenzene, tetraphenylmethane, tetraphenylsilane, diphenylsulfoxide, 1,1-diphenylacetone, 1,3-diphenylacetone, diphenylcarbonate, diphenylmethylphosphate, 2-phenoxybiphenyl, butyl stearate, 9-phenylanthracene, 1-cyclohexyl-2-pyrrolidinone, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobil Oil Corporation), HB-40® hydrogenated terphenyl (®trademark of the Monsanto Company), dioctylphthalate, dibenzothiophene, diphenylchlorophosphate, methyl myristate, methyl stearate, docosane, eicosane, dotriacontane, o-terphenyl, thianthrene, silicone oil, for example, DC-704® silicone oil and DC-710® silicone oil (®trademarks of Dow-Corning Corporation), and mixtures thereof.

Even more preferred non-solvents include 1,3,5-triphenylbenzene, tetraphenylmethane, tetraphenylsilane, diphenylsulfoxide, 2-phenoxybiphenyl, butyl stearate, 9-phenylanthracene, dioctylphthalate, methyl stearate, docosane, dotriacontane, thianthrene, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobil Oil Corporation), and mixtures thereof.

The concentrations of the components in the mixture may vary and are dependent upon the desired membrane characteristics, such as porosity and pore size, and the fabrication method. The concentration of poly(etheretherketone)-type polymer in the mixture is that which results in a mixture with a suitable viscosity for extrusion or casting at the membrane fabrication temperature. The viscosity of the mixture must not be so high that the fluid is too viscous to fabricate: the viscosity must not be too low such that the membrane lacks physical integrity. Extrusion mixtures of poly(etheretherketone)-type polymers and plasticizers generally possess non-Newtonian viscosity behavior: therefore, such mixtures exhibit a shear rate dependence upon viscosity. The mixture preferably has a viscosity at extrusion temperatures of between about 100 and about 10,000 poise at a shear rate of from about 10 to about 10,000 sec$^{-1}$, more preferably between about 200 and about 1,000 poise at a shear rate of from about 50 to about 1,000 sec$^{-1}$. The concentration of poly(etheretherketone)-type polymer in the mixture is preferably from about 10 to about 90 weight percent, more preferably from about 15 to about 80 weight percent.

The membranes of this invention may be prepared by solution casting or extrusion. In the solution casting process, the polymer is contacted with the plasticizer comprising at least one solvent and optionally at least one non-solvent for the polymer at elevated temperatures. The elevated temperature at which the mixture is contacted is that temperature at which the mixture is a homogeneous fluid, and below that temperature at which the polymer degrades and below that temperature at which the plasticizer comprising solvent and optional non-solvent boils. The upper temperature limit is preferably below about 300° C., more preferably below about 250° C. The minimum temperature limit is preferably at least about 25° C. The contacting takes place with adequate mixing or agitation to ensure a homogeneous solution.

In the case of casting, a membrane may be cast into flat sheet form by pouring the solution onto a smooth support surface and drawing down the solution to an appropriate thickness with a suitable tool such as a doctor blade or casting bar. Alternately, the solution may be cast in a continuous process by casting the solution onto endless belts or rotating drums. The casting surface may be such that the membrane may thereafter be readily separated from the surface. For example, the membrane may be cast onto a support having a low surface energy, such as silicone, coated glass, Teflon, or metal, or a surface to which the membrane will not adhere. The solution may also be cast onto the surface of a liquid with which the polymer is substantially immiscible, such as water or mercury. Alternately, the solution may be cast onto a support surface which may thereafter be dissolved away from the finished membrane. The solution may also be cast onto a porous support surface. The cast membrane is thereafter subsequently quenched or coagulated, leached, and optionally drawn as described hereinafter for membranes formed by the extrusion process.

The membranes are extruded from the poly(etheretherketone)-type polymer compositions hereinbefore described. The components of the extrusion mixture may be combined prior to extrusion by mixing in any convenient manner with conventional mixing equipment, as for example, in a Hobart mixer. The extrusion blend may also be combined and mixed under heating in a resin kettle. Alternatively, the extrusion composition may be homogenized by extruding the mixture through a twin screw extruder, cooling the extrudate, and grinding or pelletizing the extrudate to a particle size readily fed to a single or twin screw extruder. Alternatively, the components of the extrusion composition may be combined directly in a melt-pot or twin screw extruder and extruded into membranes in a single step. The use of static mixers helps to ensure mixture homogeneity.

The mixture is heated to a temperature which results in a homogeneous fluid possessing a viscosity suitable for extrusion. The temperature should not be so high or the exposure time so long as to cause significant degradation of the poly(etheretherketone)-type polymer and/or plasticizer. The temperature should not be so low as to render the fluid too viscous to extrude. The extrusion temperature is preferably between about 150° and about 400° C., more preferably between about 210° and about 380° C.

The mixture of polymer and plasticizer is extruded through a film, tube, or hollow fiber die (spinnerette). Hollow fiber spinnerettes typically are multi-holed and thus produce a tow of multiple fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the poly(etheretherketone)-type polymer. Examples of suitable core liquids include dioctylphthalate, methyl stearate, polyglycol, mineral oil, paraffin oil, petroleum oil, for example, MOBILTHERM® 600, 603, and 605 heat transfer oils (®trademarks of Mobil Oil Corporation), and silicone oil, for example, DC-704® and DC-710® silicone oil (®trademarks of Dow-Corning Corporation). Use of a liquid non-solvent as the core fluid may result in a microporous membrane with an inside skin. A solvent and non-solvent core liquid mixture may be used to control the inside skin morphology. A non-solvent fluid may optionally be used on the outside of the hollow fiber membrane to produce an outside skin.

The extrudate exiting the die enters one or more quench or coagulation zones. The environment of the quench or coagulation zone may be gaseous or liquid. Within the quench or coagulation zone, the extrudate is subjected to cooling and/or coagulation to cause solidification of the membranes with the optional simultaneous removal of a portion of the plasticizer.

In a preferred embodiment, the membranes are initially quenched in a gaseous environment such as air, nitrogen, or other inert gas. The temperature of the gaseous quench zone is that temperature at which solidification occurs at a reasonable rate. The temperature of the gaseous quench zone is preferably in the range of from about 0° to about 150° C., more preferably in the range of from about 5° to about 100° C. The residence time in the gaseous quench zone is that which is sufficient to solidify the membranes. The residence time in the gaseous quench zone is preferably at least about 0.01 seconds, more preferably at least about 0.05 seconds. The residence time in the gaseous quench zone is preferably less than about 120 seconds, more preferably less than about 30 seconds. Shrouds may be used to help control gaseous flowrates and temperatures within the gaseous quench zone.

Following or instead of the gaseous quench, the membranes may optionally be quenched or coagulated in a liquid environment which is substantially a non-solvent for the poly(etheretherketone)-type polymer, such as water or ethylene glycol, and which optionally contains an effective amount of a swelling agent. The temperature of the quench liquid is that temperature at which the membrane is not adversely affected and at which solidification occurs at a reasonable rate. The liquid quench temperature is preferably between about 0° and about 200° C., more preferably between about 0° and about 100° C. The residence time in the liquid quench zone is that which is sufficient to solidify the membranes. The residence time in the liquid quench zone is preferably at least about 0.01 seconds, more preferably at least about 0.05 seconds. The residence time in the liquid quench zone is preferably less than about 120 seconds, more preferably less than about 30 seconds.

Following quenching and/or coagulation, the membranes may be passed through one or more leach baths to remove at least a portion of the plasticizer. The leach bath need not remove all of the plasticizer from the membranes. Preferably, the leach bath removes the plasticizer to a level of less than about 2.0 weight percent in the leached membrane. The leach bath is comprised of a solution which is a non-solvent for the poly(etheretherketone)-type polymer but which is a solvent for the extrusion plasticizer. Preferred leach liquids include toluene, xylene, acetone, water, and chlorinated hydrocarbons such as methylene chloride, carbon tetrachloride, trichloroethylene, and 1,1,1-trichloroethane. The leach liquid may also comprise an acid or alkali aqueous solution if a water soluble solvent and optional non-solvent for the poly(etheretherketone)-type polymer are used in the extrusion or casting mixture. The maximum temperature of the leach bath is that temperature at which the membranes are not adversely affected. The minimum temperature of the leach bath is that temperature at which plasticizer removal from the membrane occurs at a reasonable rate. The temperature of the leach bath is preferably between about 0° and about 200° C., more preferably between about 0° and about 80° C. The residence time in the leach bath is preferably long enough to remove at least a portion of the plasticizer. The residence time in the leach bath is preferably less than about 14 hours, more preferably less than about 1 hour. The residence time in the leach bath is preferably more than about 1 second, more preferably more than about 30 seconds.

Following leaching, the membranes are dried. Prior to drying, the leach liquid remaining in the membranes may optionally be exchanged with a more volatile, non-polar drying agent which possesses a low surface tension and is a solvent for the leach liquid but a non-solvent for the poly(etheretherketone)-type polymer in order to reduce the possibility of pore collapse during drying. Preferred drying agents include chlorofluorocarbons, for example, FREON 113 ® chlorofluorocarbon (®trademark of E. I. duPont de Nemours). The exchange may be carried out at temperatures which do not adversely affect the membrane, preferably between about 0° and about 100° C. The membranes may be dried in air or an inert gas such as nitrogen. Drying may also be done under vacuum. The membranes may be dried at temperatures at which drying takes place at a reasonable rate and which do not adversely affect the membranes. The drying temperature is preferably between about 0° and about 140° C., more preferably between about 10° and 80° C. The drying time is preferably less than about 24 hours, more preferably less than about 6 hours. The drying time is preferably at least about 30 seconds, more preferably at least about 60 seconds.

The membranes are drawn using conventional equipment such as godets to improve the flux and strength of the membranes. Drawing may occur before, during, and/or after leaching or drying. The draw temperature is dependent upon whether the membrane contains plasticizer at the time of drawing. For substantially plasticizer free membranes, the membranes are drawn at a temperature which is above the glass transition temperature and below the crystalline melting point of the poly(etheretherketone)-type polymer: the minimum temperature at which the membranes are drawn is preferably at least about 140° C., more preferably at least about 150° C. The maximum temperature at which the membranes are drawn is preferably less than about 360° C., more preferably less than about 330° C. For membranes containing plasticizer, the membrane is drawn at a temperature between ambient temperature and the melting point of the poly(etheretherketone)-type polymer or the depressed melting point of the poly(etheretherketone)-type polymer and plasticizer mixture: preferred lower draw temperatures are about 25° C. or above: preferred upper draw temperatures are less than about 10° C. below the depressed melting point or lower. The membranes are drawn by stretching the membranes under tension. The membranes are drawn to a ratio of between about 1.1 to about 10. The draw ratio refers to the ratio of the original length of the membrane before drawing to the final length of the membrane after drawing. The degree of draw may also be expressed as percent elongation, which equals $$\frac{L_f - L_i}{L_i} \times 100$$

wherein $L_f$ is the final length of the membrane after drawing and $L_i$ is the initial length of the membrane before drawing.

Line speeds for drawing are not critical and may vary significantly. Practical preferred line speeds range from about 10 feet per minute to about 2,000 feet per minute. In the case of hollow fibers, the fibers preferably possess an outside diameter of from about 50 to about 3,000 microns, more preferably of from about 80 to about 2,000 microns, with a wall thickness preferably of from about 10 to about 400 microns, more preferably of from about 20 to about 400 microns. In the case of films, the films preferably possess a thickness of from about 10 to about 700 microns, more preferably of from about 25 to about 500 microns. The films may optionally be supported by a permeable cloth or screen.

Optionally, before or after leaching and/or drawing, the membranes may be annealed by exposing the membranes to elevated temperatures. The membranes may be annealed at temperatures above the glass transition temperature (Tg) of the polymer or polymer/plasticizer mixture and about 10° C. below the melting point of the polymer or depressed melting point of the polymer/plasticizer mixture for a period of time between about 30 seconds and about 24 hours.

The membranes of this invention may be isotropic or anisotropic. Isotropic microporous membranes possess a morphology in which the pore size within the membrane is substantially uniform throughout the membrane. Anisotropic (asymmetric) microporous membranes possess a morphology in which a pore size gradient exists across the membrane: that is, the membrane morphology varies from highly porous, larger pores at one membrane surface to less porous, smaller pores at the other membrane surface. Such anisotropic membranes thus possess a microporous "skin" of smaller pores. In hollow fiber anisotropic membranes, the "skin" may be on the inside or outside surface of the hollow fiber. The term asymmetric is often used interchangeably with the term anisotropic.

In a preferred embodiment of this invention, the microporous membranes are useful in the treatment of liquids by the membrane separation processes of microfiltration, ultrafiltration, membrane stripping, and membrane distillation. Such membranes may also be used as porous supports for composite gas or liquid separation membranes. In an especially preferred embodiment, the microporous membranes are useful for ultrafiltration or microfiltration. Ultrafiltration and microfiltration are pressure driven filtration processes using microporous membranes in which particles or solutes are separated from solutions. Separation is achieved on the basis of differences in particle size or molecular weight.

Ultrafiltration and microfiltration membranes may be characterized in a variety of ways, including porosity, mean pore size, maximum pore size, bubble point, gas flux, water flux, and molecular weight cut off. Such techniques are well known in the art for characterizing microporous membranes. See Robert Kesting, *Synthetic Polymer Membranes*, 2nd edition, John Wiley & Sons, New York, N.Y., 1985, pp. 43–64: Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Methods F316-86 and F317-72 (1982): the relevant portions are incorporated herein by reference.

Porosity refers to the volumetric void volume of the membrane. Porosity may be determined gravimetrically from the density of the void-free polymer and from the differences between the wet and dry weights of the membrane. The membranes must possess porosities permitting sufficient flux through the membrane while retaining sufficient mechanical strength under use conditions. The membranes of this invention preferably have a porosity of at least about 10 percent, more preferably at least about 20 percent; the membranes about 85 percent.

Pore size of the membrane may be estimated by several techniques including scanning electron microscopy, and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation $$r = \frac{2G}{P}$$

wherein
r is the pore radius,
G is the surface tension (water/air), and
P is the pressure.

The membranes of this invention useful for ultrafiltration preferably exhibit a bubble point with denatured alcohol of at least about 5 psi.

The mean pore size of the membranes of this invention useful for ultrafiltration is preferably between about 5 and about 1000 Angstroms, more preferably between about 10 and about 500 Angstroms: the maximum pore size of such membranes is preferably less than about 1000 Angstroms, more preferably less than about 800 Angstroms. The mean pore size of the membranes of this invention useful for microfiltration is preferably between about 0.02 and about 10 microns, more preferably between about 0.05 and about 5 microns: the maximum pore size of such membranes is preferably less than about 10 microns, more preferably less than about 8 microns.

Gas flux is defined as $$F = \frac{\text{(amount of gas passing through the membrane)}}{\text{(membrane area) (time) (driving force across the membrane)}}.$$

A standard gas flux unit is $$\frac{(\text{centimeter})^3 \text{ (STP)}}{(\text{centimeter})^2 \text{ (second) (centimeter Hg)}},$$

abbreviated hereinafter as $$\frac{\text{cm}^3 \text{ (STP)}}{\text{cm}^2 \text{ sec cmHg}}$$

where STP stands for standard temperature and pressure.

The membranes of this invention preferably have a gas flux for nitrogen of at least about $$10^{-6} \frac{\text{cm}^3 \text{ (STP)}}{\text{cm}^2 \text{ sec cmHg}},$$

more preferably of at least about $$10^{-5} \frac{\text{cm}^3 \text{ (STP)}}{\text{cm}^2 \text{ sec cmHg}}.$$

Water flux is defined as $$W = \frac{\text{(amount of water passing through the membrane)}}{\text{(membrane area) (time)}}$$

under given conditions of temperature and pressure.

The membranes of this invention preferably exhibit a water flux of at least about $$\frac{1 \text{ ml}}{\text{m}^2 \text{ hr cmHg}}.$$

The membranes are fabricated into flat sheet, spiral wound, tubular, or hollow fiber devices by methods described in the art. Spiral wound, tubular, and hollow fiber devices are preferred. Tubesheets may be affixed to the membranes by techniques known in the art. Preferred tubesheet materials include thermoset and thermoplastic polymers. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

Ultrafiltration and microfiltration are pressure driven filtration processes using microporous membranes to recover or isolate solutes or particles from solutions.

The membrane divides the separation chamber into two regions, a higher pressure side into which the feed solution is introduced and a lower pressure side. One side of the membrane is contacted with the feed solution under pressure, while a pressure differential is maintained across the membrane. To be useful, a least one of the particles or solutes of the solution is selectively retained on the high pressure side of the membrane while the remainder of the solution selectively passes through the membrane. Thus the membrane selectively "rejects" at least one type of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

The separation process should be carried out at pressures which do not adversely affect the membrane, that is, pressures which do not cause the membrane to mechanically fail. The pressure differential across the membrane is dependent upon the membrane characteristics, including pore size and porosity. For the membranes of this invention, the pressure differential across the membrane is preferably between about 5 and about 500 psig, more preferably between about 10 and about 300 psig. The separation process should be carried out at temperatures which do not adversely affect membrane integrity. Under continuous operation, the operating temperature is preferably between about 0° and about 350° C., more preferably between about 15° and about 300° C., even more preferably between about 20° and about 250° C.

SPECIFIC EMBODIMENTS

The following examples are presented for illustrative purposes only and are not intended to limit the scope of the invention or claims.

EXAMPLE 1

Solvents and Non-solvents for Polyetheretherketone (PEEK)

Poly(etheretherketone), designated as Grade 150P, is obtained from ICI Americas, Inc., Wilmington, Del. The PEEK is dried at 150° C. for 16 hours in an air-circulating oven and is stored in a desiccator over Drierite. One hundred seven organic compounds are evaluated for their solvent effect on PEEK. Most of the organic compounds may be obtained from Aldrich Chemical Company and used as received. Other organic chemicals may be obtained from suppliers as listed in *Chemical Sources*, published annually by Directories Publishing Co., Inc., of Columbia, S.C.

Mixtures of PEEK and solvent, a total weight of less than about 2 grams, are prepared by weighing PEEK and solvent to a precision of ±0.001 gram in a 1 to 4 dram size glass vial. The resulting air space in each vial, which varies considerably due to the large differences in the bulk densities of the compounds, is purged with nitrogen. The vials are sealed with screw caps containing aluminum foil liners. Solubility is usually determined at about 10 weight percent polymer, followed by additional determinations at about 25 and about 50 weight percent if necessary.

In the following tables, in the solubility column, "g" is greater than (>), and "s" is smaller or less than (<), and = is equal to.

Table 1 below lists the solvent effect of 107 organic compounds on PEEK. The approximate solubility of each polymer-organic compound mixture is shown at the indicated temperature(s). Also listed in Table 1 is an approximate molecular weight, melting point, and boiling point of each organic compound, if these physical properties are available.

FIG. 1 shows a composite of temperature at ambient pressure at which a specific weight percent of PEEK will dissolve in the solvents m-terphenyl, pyrene, fluoranthene and diphenylsulfone. Any combination of temperature and polymer concentration above each line represents homogeneous, soluble, one phase mixtures. Similarly, any combination below each line represents insoluble, multiphase mixtures.

| Compound | Approximate Molec. Weight | Melting Point | Boiling Point | Solub. (g = >; s = <) | Temp. (°C.) |
|---|---|---|---|---|---|
| Triphenylmethanol | 260 | 161 | 360 | g 50.1%? | 349 |
| Triphenylmethane | 244 | 93 | 359 | g 50.2% | 349 |
| Triphenylene | 228 | 196 | 438 | g 50.0% | 350 |
| 1,2,3-Triphenylbenzene | 306 | 158 | — | g 50.1% | 349 |
| 1,3,5-Triphenylbenzene | 306 | 173 | 460 | s 9.9% | 349 |
| Tetraphenylmethane | 320 | 281 | 431 | =s 10.7% | 349 |
| Tetraphenylsilane | 337 | 236 | 422 | s 10.1% | 349 |
| Diphenyl sulfoxide | 202 | 70 | 350 | s 10.5% a | 349 |
| Diphenyl sulfone | 218 | 124 | 379 | g 50.0% | 349 |
| 2,5-Diphenyloxazole | 221 | 72 | 360 | g 50.0% | 349 |
| Diphenic acid | 242 | 228 | — | g 25.1%? a | 349 |
| 1,1-Diphenylacetone | 210 | 60 | — | s 10.0% | 302 |
| 1,3-Diphenylacetone | 210 | 33 | 330 | s 10.1% | 302 |
| 4-Acetylbiphenyl | 196 | 117 | — | s 10.3% | 302 |
| 2-Biphenylcarboxylic acid | 198 | 109 | 349 | g 50.1% | 349 |
| 4-Biphenylcarboxylic acid | 198 | 225 | — | g 10.0% | 349 |
| 4-Biphenylcarboxylic acid | 198 | 225 | — | =g 50.1%? | 349 |
| m-Terphenyl | 230 | 83 | 379 | g 50.2% | 349 |
| m-Terphenyl | 230 | 83 | 379 | s 5.0% | 302 |
| 4-Benzoylbiphenyl | 258 | 100 | 419 | g 50.1% | 349 |
| 4-Benzoylbiphenyl | 258 | 100 | 419 | s 5.2% | 302 |
| 4,4'-Diphenylbenzophenone | 334 | — | — | s 10.4% | 302 |
| 1-Benzoyl-4-piperidone | 203 | 56 | 399 | g 9.8%? a | 349 |

-continued

| Compound | Molec. Weight | Melting Point | Boiling Point | Approximate Solub. (g = >;s = <) | Temp. (°C.) |
|---|---|---|---|---|---|
| 2-Benzoylnaphthalene | 232 | 81 | 383 | g 49.9% | 349 |
| Diphenyl carbonate | 214 | 79 | 301 | s 10.1% | 302 |
| Bibenzyl | 182 | 51 | 284 | s 10.3% | 274 |
| Diphenyl methyl phosphate | 264 | — | 389 | s 10.0% a | 349 |
| 1-Bromonaphthalene | 207 | −1 | 280 | s 9.8% | 274 |
| N,N-Diphenylformamide | 197 | 71 | 337 | g 9.9% | 302 |
| N,N-Diphenylformamide | 197 | 71 | 337 | s 25.2% | 302 |
| 3-Phenoxybenzyl alcohol | 200 | — | 329 | g 24.7% | 302 |
| 3-Phenoxybenzyl alcohol | 200 | — | 329 | s 49.9% | 302 |
| Fluoranthene | 202 | 108 | 384 | g 50.0% | 349 |
| 2-Phenoxybiphenyl | 246 | 49 | 342 | s 10.9% | 302 |
| Triphenyl phosphate | 326 | 51 | 281 | s 9.9% | 274 |
| Cyclohexyl phenyl ketone | 188 | 56 | — | s 9.9% | 302 |
| 2,5-Diphenyl-1,3,4-oxadiazole | 222 | 139 | 382 | g 49.9% | 349 |
| 1,4-Dibenzoylbutane | 266 | 107 | — | s 10.0% | 302 |
| 9-Fluorenone | 180 | 83 | 342 | g 24.9% | 302 |
| 9-Fluorenone | 180 | 83 | 342 | s 50.0% | 302 |
| 1,2-Dibenzoyl benzene | 286 | 146 | — | g 50.2% | 349 |
| Dibenzoylmethane | 224 | 78 | 360 | g 50.4% | 349 |
| 2,4,6-Trichlorophenol | 197 | 65 | 246 | s 9.0% | 240 |
| Benzil | 210 | 94 | 347 | g 10.2% | 302 |
| Benzil | 210 | 94 | 347 | s 25.0% | 302 |
| p-Terphenyl | 230 | 212 | 389 | s 9.8% | 302 |
| p-Terphenyl | 230 | 212 | 389 | g 50.0% | 349 |
| Anthracene | 178 | 216 | 340 | g 10.0% | 302 |
| Anthracene | 178 | 216 | 340 | s 24.7% | 302 |
| Mineral oil | — | — | 360 | s 10.7% | 349 |
| Butyl stearate | 341 | — | 343 | s 10.0% | 302 |
| 9-Phenylanthracene | 254 | 151 | 417 | g 10.4%? a | 349 |
| 1-Phenylnaphthalene | 204 | — | 324 | g 9.9% | 302 |
| 1-Phenylnapthalene | 204 | — | 324 | s 25.0% | 302 |
| 4-Phenylphenol | 170 | 166 | 321 | g 25.8% | 297 |
| 4-Phenylphenol | 170 | 166 | 321 | s 50.0% | 302 |
| 4-Phenylphenol | 170 | 166 | 321 | g 50.0% | 304 |
| 2-Phenylphenol | 170 | 59 | 282 | s 10.2% | 274 |
| 1-Ethoxynaphthalene | 172 | — | 280 | s 10.2% | 274 |
| Phenyl benzoate | 198 | 69 | 298 | s 9.8% | 274 |
| 1-Phenyldecane | 218 | — | 293 | s 10.2% | 274 |
| 1-Methoxynaphthalene | 158 | — | 269 | s 10.0% | 240 |
| 2-Methoxynaphthalene | 158 | 74 | 274 | s 9.4% | 240 |
| 4-Bromobiphenyl | 233 | 86 | 310 | g 5.2% | 300 |
| 4-Bromobiphenyl | 233 | 86 | 310 | s 24.8% | 302 |
| 4-Bromobiphenyl | 233 | 86 | 310 | s 5.2% | 241 |
| 4-Bromodiphenyl ether | 249 | 18 | 305 | =g 5.4% | 300 |
| 4-Bromodiphenyl ether | 249 | 18 | 305 | s 24.8% | 302 |
| 4-Bromodiphenyl ether | 249 | 18 | 305 | s 5.4% | 241 |
| 1,3-Diphenoxybenzene | 262 | 60 | — | =s 5.4% a | 300 |
| 1,3-Diphenoxybenzene | 262 | 60 | — | s 5.4% a | 241 |
| 1,8-Dichloroanthraquinone | 277 | 202 | — | s 5.3% a | 300 |
| 1,8-Dichloroanthraquinone | 277 | 202 | — | s 5.3% a | 241 |
| 9,10-Dichloroanthracene | 247 | 214 | — | s 5.5% a | 300 |
| 4,4'-Dibromobiphenyl | 312 | 170 | 355 | g 5.2% | 241 |
| 4,4'-Dibromobiphenyl | 312 | 170 | 355 | g 5.2% | 300 |
| 4,4'-Dibromobiphenyl | 312 | 170 | 355 | s 25.1% | 302 |
| 4,4'-Dibromobiphenyl | 312 | 170 | 355 | g 50.1% | 349 |
| Benzophenone | 182 | 50 | 305 | s 11.3% | 241 |
| Benzophenone | 182 | 50 | 305 | =g 11.3% | 300 |
| Benzophenone | 182 | 50 | 305 | s 24.9% | 302 |
| Polyphosphoric acid | — | — | — | s 4.8% a | 300 |
| 1-Chloronaphthalene | 162 | −20 | 258 | s 9.9% | 241 |
| Diphenyl ether | 170 | 27 | 259 | s 10.1% | 241 |
| 1-Cyclohexyl-2-pyrrolidinone | 167 | — | 302 | =s 10.0% a | 300 |
| 1-Benzyl-2-pyrrolidinone | 175 | — | — | g 14.9% | 302 |
| 1-Benzyl-2-pyrrolidinone | 175 | — | — | s 32.9% | 302 |
| o,o'-Biphenol | 186 | 109 | 315 | s 5.1% | 221 |
| o,o'-Biphenol | 186 | 109 | 315 | g 9.8% | 302 |
| o,o'-Biphenol | 186 | 109 | 315 | s 25.0% | 302 |
| HB-40 (hydrogenated terphenyl)* | 244 | — | 325 | s 9.9% | 302 |
| Dioctyl phthalate | 391 | −50 | 384 | s 10.8% | 349 |
| 5-Chloro-2-benzoxazolone | 170 | 191 | — | s 10.2% a | 349 |
| Dibenzothiophene | 184 | 98 | 332 | g 10.3%? b? | 302 |
| Bis(4-chlorophenyl sulfone) | 287 | 146 | 412 | s 15.3% | 349 |
| Diphenyl phthalate | 318 | 79.5 | — | g 50.0% | 349 |
| 2,6-Diphenylphenol | 246 | 101 | — | g 50.0% | 349 |
| Diphenyl sulfide | 186 | −40 | 296 | s 9.0% | 274 |
| Diphenyl chlorophosphate | 269 | — | 360 | s 9.9% | 349 |

-continued

| Compound | Molec. Weight | Melting Point | Approximate Boiling Point | Solub. (g = >;s = <) | Temp. (°C.) |
|---|---|---|---|---|---|
| Fluorene | 166 | 113 | 298 | s 10.1% | 274 |
| Phenanthrene | 178 | 100 | 340 | g 10.0% | 302 |
| Phenanthrene | 178 | 100 | 340 | s 25.0% | 302 |
| Sulfolane | 120 | 27 | 285 | s 10.1% | 274 |
| Methyl myristate | 242 | 18 | 323 | s 8.2% | 302 |
| Methyl stearate | 299 | 38 | 358 | s 10.1% | 349 |
| Phenothiazine | 199 | 182 | 371 | g 49.9% | 349 |
| Hexadecane | 226 | 19 | 288 | s 10.0% | 274 |
| Dimethyl phthalate | 194 | 2 | 282 | s 10.0% | 274 |
| Tetraethylene glycol dimethyl ether | 222 | −30 | 275 | s 9.6% | 240 |
| Diethylene glycol dibutyl ether | 218 | −60 | 256 | s 9.6% | 240 |
| Docosane | 311 | 44 | 369 | s 10.4% | 349 |
| Eicosane | 283 | 37 | 340 | s 7.9% | 302 |
| Dotriacontane | 451 | 70 | 476 | s 10.4% | 349 |
| 2,7-Dimethoxynaphthalene | 188 | 138 | — | g 10.0% ab | 349 |
| 2,6-Dimethoxynaphthalene | 188 | 153 | — | g 10.8% b | 349 |
| o-Terphenyl | 230 | 58 | 337 | s 9.9% | 302 |
| 4,4′-Dimethoxy-benzophenone | 242 | 142 | — | g 50.0% | 349 |
| 9,10-Diphenylanthracene | 330 | 246 | — | g 50.0% | 349 |
| 1,1-Diphenylethylene | 180 | 6 | 270 | s 9.7% | 240 |
| epsilon-Caprolactam | 113 | 71 | 271 | s 10.0% | 240 |
| Tetraphenylethylene | 332 | 223 | 420 | s 10.9% | 302 |
| Pentafluorophenol | 184 | 35 | 143 | s 9.9% | 140 |
| Pentafluorophenol | 184 | 35 | 143 | g 5.0% | 141 |
| Thianthrene | 216 | 158 | 365 | s 10.2% | 302 |
| Pentachlorophenol | 266 | 189 | 310 | g 25.0% | 302 |
| Pentachlorophenol | 266 | 189 | 310 | s 50.6% | 302 |
| Pyrene | 202 | 150 | 404 | g 50.0% | 347 |
| Benzanthrone | 230 | 169 | — | s 25.5% ab | 328 |
| 9,9′-Bifluorene | 330 | 247 | — | s 25.2% | 327 |
| 9,9′-Bifluorene | 330 | 247 | — | g 50.2% | 318 |
| 9,9′-Bifluorene | 330 | 247 | — | g 50.2% | 327 |
| Santowax R* Chem Abstr. #26140-60-3 | — | 145 | 364 | g 60.0% | 347 |
| Therminol 66* Chem Abstr. #61788-32-7 | 240 | — | 340 | g 50.1% | 337 |
| Therminol 75* Chem Abstr. #26140-60-3 Chem Abstr. #217-59-4 | — | 70 | 385 | g 24.9% | 325 |
| Therminol 75* | — | 70 | 385 | g 50.3% | 332 |
| 1-Phenyl-2-pyrrolidinone | 161 | 68 | 345 | g 10.1% | 279 |
| 1-Phenyl-2-pyrrolidinone | 161 | 68 | 345 | g 25.5% | 290 |
| 1-Phenyl-2-pyrrolidinone | 161 | 68 | 345 | g 50.0% | 317 |
| 4,4′-Isopropylidenediphenol | 228 | 156 | 402 | =g 50.0% | 301 |
| 4,4′-Isopropylidenediphenol | 228 | 156 | 402 | g 50.0% | 318 |
| 4,4′-Didihydroxy-benzophenone | 214 | 214 | — | s 10.0% | 301 |
| 4,4′-Didihydroxy-benzophenone | 214 | 214 | — | g 25.0% | 310 |
| 4,4′-Didihydroxy-benzophenone | 214 | 214 | — | s 50.0% | 319 | a = Black or very dark color
b = reacts?
*Monsanto Company

EXAMPLE 2

PEEK Membranes Fabricated Without Drawing

This example is not an illustration of the invention but is intended for comparative purposes only.

A mixture of about 50 weight percent VICTREX® PEEK (Grade 450G) and about 50 weight percent diphenylsulfone is extruded into hollow fibers using a spinnerette with a 10 mil annulus at a temperature of about 320° C. The fiber size as extruded is about 222 microns I.D. with a wall thickness of about 34 microns. The fibers are leached in methylene chloride under tension at ambient temperature for about 1 hour. The fibers are dried under vacuum at ambient temperature for at least 1 hour. Following drying, the fiber size is about 217 microns I.D. with a wall thickness of about 36 microns.

Analysis of the fibers shows a weight loss of about 35.1 percent during the leaching step, indicating that the majority of diphenylsulfone has been removed from the fibers. Upon testing for gas flux, the gas flux for nitrogen is found to be less than about $$1.2 \times 10^{-7} \frac{cm^3 \,(STP)}{cm^2 \, sec. \, cmHg}.$$

EXAMPLE 3

PEEK Membranes Fabricated Without Drawing

This example is not an illustration of the invention but is intended for comparative purposes only.

A mixture of about 50 weight percent VICTREX® PEEK and about 50 weight percent diphenylsulfone is extruded into hollow fibers using a spinnerette with a 5 mil annulus at a temperature of about 300°–315° C., with a shear rate in the spinnerette annulus of about 925 sec$^{-1}$. The fiber size as extruded is about 117 microns I.D. with a wall thickness of about 26 microns.

The fibers are leached in acetone under tension at ambient temperature for about 1 hour and then dried under vacuum at ambient temperature for at about 2 hours. Following drying, the fiber size is about 99 microns I.D. with a wall thickness of about 25 microns.

Analysis of the fibers shows a weight loss of about 34.7 percent during the leaching step, resulting in a porosity based on final fiber dimensions of about 38.1 percent. Upon testing for gas flux, the gas flux for nitrogen is determined to be less than about $$1.0 \times 10^{-6} \frac{cm^3 \ (STP)}{cm^2 \ sec. \ cmHg}.$$

EXAMPLE 4

PEEK Membranes Fabricated Without Drawing

This example is not an illustration of the invention but is intended for comparative purposes only.

A mixture of about 50 weight percent VICTREX® PEEK and about 50 weight percent diphenylsulfone is extruded into hollow fibers using a spinnerette with a 5 mil annulus at a temperature of about 260° (spinnerette) –310 (pack) ° C., with a shear rate in the spinnerette annulus of about 925 sec$^{-1}$. The fiber size as extruded is about 112 microns I.D. with a wall thickness of about 29.5 microns.

The fibers are leached in acetone under tension at ambient temperature for about 1 hour and then dried under vacuum at ambient temperature for about 2 hours. Following drying, the fiber size is about 85 microns I.D. with a wall thickness of about 25 microns.

Analysis of the fibers shows a weight loss of about 34.7 percent during the leaching step, resulting in a porosity based on final fiber dimensions of about 26.9 percent. Upon testing for gas flux, the gas flux for nitrogen is determined to be about $$0.11 \times 10^{-4} \frac{cm^3 \ (STP)}{cm^2 \ sec. \ cmHg}.$$

EXAMPLE 5

PEEK Membranes Fabricated With Drawing During Leach

A mixture of about 50 weight percent VICTREX® PEEK and about 50 weight percent diphenylsulfone is extruded into hollow fibers using a spinnerette with a 10 mil annulus at a temperature of about 315° C. The fibers are placed in a glycerol bath at about 120° C. for about 5 minutes before drawing about 73 percent. The fibers are then leached in acetone under tension at ambient temperature for about 1 hour and then dried under tension under vacuum at ambient temperature for about 2 hours. Following drying, the fiber size is about 142 microns I.D. with a wall thickness of about 22 microns.

Upon testing for gas flux, the gas flux for nitrogen is determined to be about $$3.1 \times 10^{-4} \frac{cm^3 \ (STP)}{cm^2 \ sec. \ cmHg}.$$

EXAMPLE 6

PEEK Membranes Fabricated With Drawing During Leach

A mixture of about 50 weight percent VICTREX® PEEK and about 50 weight percent diphenylsulfone is extruded into hollow fibers using a spinnerette with a 10 mil annulus at a temperature of about 315° C., with a shear rate in the spinnerette annulus of about 272 sec$^{-1}$. The fiber size as extruded is about 221 microns I.D. with a wall thickness of about 37 microns.

The fibers are placed in a glycerol bath at about 120° C. for about 5 minutes before drawing about 24 percent. The fibers are then leached in acetone under tension at ambient temperature for about 1 hour and then dried under tension under vacuum at ambient temperature for about 2 hours. Following drying, the fiber size is about 173 microns I.D. with a wall thickness of about 27 microns.

Upon testing for gas flux, the gas flux for nitrogen is determined to be about $$2.34 \times 10^{-4} \frac{cm^3 \ (STP)}{cm^2 \ sec. \ cmHg}.$$

EXAMPLE 7

PEEK Membranes Fabricated With Drawing During Leach

A mixture of about 50 weight percent VICTREX® PEEK and about 50 weight percent diphenylsulfone is extruded into hollow fibers using a spinnerette with a 5 mil annulus at a temperature of about 260° (spinnerette) –310 (pack) ° C. The fiber size as extruded is about 117 microns I.D. with a wall thickness of about 26 microns.

The fibers are leached in acetone under tension at ambient temperature for about 1 hour and then dried stretched. The fibers are then dried under vacuum at ambient temperature under tension for about 2 hours. Following drying, the fiber size is about 74 microns I.D. with a wall thickness of about 22 microns.

Analysis of the fibers shows a weight loss of about 40.1 percent during the leaching step, resulting in a porosity of about 31.9 percent based on final fiber size. Upon testing for gas flux, the gas flux for nitrogen is determined to be about $$1.2 \times 10^{-4} \frac{cm^3 \ (STP)}{cm^2 \ sec. \ cmHg}.$$

EXAMPLE 8

PEEK Membranes Fabricated With Drawing After Leach

A mixture of about 50 weight percent VICTREX® PEEK and about 50 weight percent diphenylsulfone is extruded into hollow fibers using a spinnerette with a 10 mil annulus at a temperature of about 315° C., with a shear rate in the spinnerette annulus of about 272 sec$^{-1}$. The fiber size as extruded is about 221 microns I.D. with a wall thickness of about 37 microns.

The fibers are leached in acetone under tension at ambient temperature for about 1 hour and then dried under tension under vacuum at ambient temperature under tension for about 2 hours. The dried fiber is placed in a glycerol at about 120° C. for about 5 minutes before drawing about 73 percent to a final fiber size of about 111 microns I.D. with a wall thickness of about 27 microns.

Analysis of the fibers shows a weight loss of about 49.9 percent during the leaching step. Upon testing for gas flux, the gas flux for nitrogen is determined to be about $$12.2 \times 10^{-4} \frac{cm^3 \ (STP)}{cm^2 \ sec. \ cmHg}.$$

EXAMPLE 9

PEEK Membranes Fabricated With Drawing After Leach

A mixture of about 50 weight percent VICTREX® PEEK and about 50 weight percent diphenylsulfone is extruded into hollow fibers using a spinnerette with a 5 mil annulus at a temperature of about 260° (spinnerette) –310 (pack) ° C. The fiber size as extruded is about 112 microns I.D. with a wall thickness of about 29.5 microns.

The fibers are leached in acetone under tension at ambient temperature for about 1 hour and then dried under vacuum at ambient temperature for about 2 hours. The fibers are then placed in a glycerol bath at about 120° C. for about 5 minutes before drawing about 73 percent to a final fiber size of about 98.5 microns I.D. with a wall thickness of about 24 microns.

Analysis of the fibers shows a weight loss of about 39.4 percent during the leaching step, resulting in a porosity based upon final fiber size of about 49.5 percent. Upon testing for gas flux, the gas flux for nitrogen is determined to be less than about $$5.0 \times 10^{-4} \frac{cm^3 \ (STP)}{cm^2 \ sec. \ cmHg}.$$

The water flux through the membrane after wetting the pores with ethanol is determined to be about $$\frac{1.6 \ ml}{m^2 \ hr \ cmHg}.$$

What is claimed is:

1. A microporous semi-permeable membrane comprised of a drawn unsulfonated poly(etheretherketone)-type polymer, said membrane possessing a nitrogen flux of at least about $$1 \times 10^{-6} \frac{cm^3 \ (STP)}{cm^2 \ sec \ cmHg}.$$

2. The membrane of claim 1 wherein the unsulfonated poly(etheretherketone)-type polymer is selected from the group consisting of poly(etherketone), poly(aryletherketone), poly(etheretherketone), poly(etherketoneketone), poly(etheretheretherketone), poly(etheretherketoneketone), poly(etherketoneetherketoneketone), and mixtures thereof.

3. The membrane of claim 2 wherein the membrane is useful for ultrafiltration or microfiltration.

4. The membrane of claim 3 wherein the membrane possesses a porosity in the range of about 10 to about 90 percent.

5. The membrane of claim 4 wherein the membrane possesses a mean pore size in the range of from about 5 to about 1000 Angstroms for ultrafiltration and a mean pore size in the range of from about 0.02 to about 10 microns for microfiltration.

6. The membrane of claim 5 wherein the membrane exhibits a bubble point with denatured alcohol of at least about 5 psi.

7. The membrane of claim 6 wherein the membrane possesses a nitrogen flux of at least about $$1 \times 10^{-5} \frac{cm^3 \ (STP)}{cm^2 \ sec \ cmHg}.$$

8. The membrane of claim 6 wherein the membrane possesses a water flux of at least about $$1 \frac{ml}{m^2 \ hr \ cmHg}.$$

9. The membrane of claim 4 wherein the unsulfonated poly(etheretherketone)-type polymer has a degree of crystallinity of at least about 30 percent and a melting point of at least about 190° C.

10. The membrane of claim 5 wherein the membrane is a hollow fiber.

11. The membrane of claim 5 wherein the membrane is a film.

12. The membrane of claim 5 wherein the membrane is isotropic.

13. The membrane of claim 5 wherein the membrane is anisotropic.

* * * * *